J. RHEINBERG.
COLOR PRINTING.
APPLICATION FILED APR. 17, 1908.
930,689.
Patented Aug. 10, 1909.
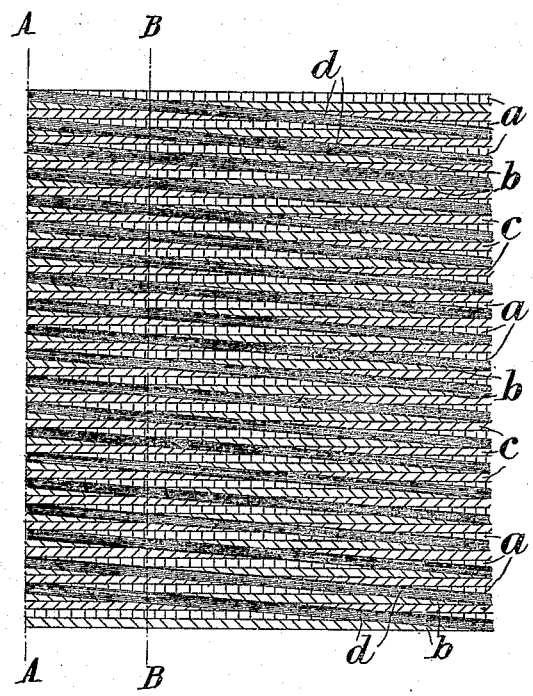

UNITED STATES PATENT OFFICE.

JULIUS RHEINBERG, OF LONDON, ENGLAND.

COLOR-PRINTING.

No. 930,689.   Specification of Letters Patent.   Patented Aug. 10, 1909.

Application filed April 17, 1908. Serial No. 427,713.

*To all whom it may concern:*

Be it known that I, JULIUS RHEINBERG, a subject of the King of Great Britain, residing at London, England, have invented certain new and useful Improvements Relating to Color-Printing, of which the following is a specification.

This invention relates to a method of obtaining widely varied color effects by printing in monochrome on paper or other material which is suitably prepared as hereinafter described.

The invention is a commercial application of a number of optical principles.

When lines or dots are printed upon a suitable surface very close together, they become individually indistinguishable to the unassisted eye. The number of lines or dots per inch to obtain optical fusion of the individual colors depends upon and is inversely proportional to the distance from which they are viewed. If two or more colors which contrast with one another are fused as above indicated, the resulting mixture will frequently contrast vividly with the component colors themselves, and will in general be of a decidedly lighter hue. Further, if from any such color mixture, we can obliterate one or more of its components, the color resulting will likewise contrast with the total mixture, and will in general be of a deeper hue. In applying these principles I produce on paper or other material, lines, dots or patterns of various shapes, in various colors and haphazard colorations, in any desired regular sequence, and which when viewed from the correct distance exhibits, as already explained by optical fusion, the required ground tint. I now print on this paper or material, using an impression surface which is similarly provided with lines or dots the pitch of which in the majority of cases is made to correspond to the pitch of the sets of color lines or dots on the surface to be printed upon, the said impression surface being supplied with an opaque preferably dark ink or pigment. Where these printed lines or dots obliterate any of the color lines or dots of the paper, the latter assumes the hue resulting from the color mixture of the non-obliterated colors, which, as explained above, is deeper and contrasts with the general hue.

In cases where the printing is effected with a colored pigment, the paper assumes the hue resulting from the color mixture of the obliterating with the non-obliterated colors. If for example the lines on the paper are in suitably selected hues of red, green and blue occurring in succession, then the paper will appear gray, and if I print on this in black with an impression surface or block the lines of which happen to cover each of the green lines, leaving the other lines exposed, the result will be that this printed portion of the paper will appear to have a bluish-red or purple tint. Similarly if the red lines are covered, the paper will appear blue green, and if the blue lines are covered, the paper will appear orange red. If the obliterating lines do not correspond in pitch exactly with the sets of color lines, for instance if there are 101 obliterating lines to 100 sets of color lines, and supposing the obliterating and color lines to be perfectly parallel, the effect will then be obtained of a band of color in approximately the hues of the spectrum, extending over 100 sets of the color lines on the paper. If the obliterating lines are slightly inclined to the color lines, bands of changing colors are produced. Moreover, two or more sets of obliterating lines may be printed on the color lines at different angles, so as to produce a double or triple series of bands of changing colors. If two sets of obliterating lines different in pitch from the sets of color lines be printed at different angles relatively to the color lines, lozenge shaped areas of changing colors may be produced. By using radial lines on the impression surface, parabolic curves of changing colors may be obtained. In some cases, moreover, I may employ series of sinuous, wavy, or zigzag lines on the printing block and straight color lines on the surface to be printed upon, or vice-versa, or both may be sinuous, wavy or zigzag.

In the accompanying drawing, I have indicated on a greatly magnified scale, one mode of carrying my invention into effect, using a series of parallel straight color lines to form the ground tint, and a series of obliterating parallel straight lines on the impression surface.

The letters *a, b, c* denote the color lines, *e. g.* red, green, blue in regular succession, and *d, d* the obliterating lines, which are shown impressed on the ground at an angle to the color lines. It will be seen that along the dotted line A, the color line *a* is consistently obliterated, and the prevailing color will therefore be that produced by the optical fusion of the lines $b$ and $c$, together with an admixture of the obliterating color. Along the dotted line B however, it will be seen that the color line $b$ is obliterated, with the result that a corresponding change occurs in the prevailing color at that part. Between these two dotted lines A, B, intermediate color results will obviously be obtained. The drawing shows one arrangement of lines, but of course it does not illustrate the effect produced when color lines are used.

By preparing the paper initially with color dots, lines or patterns of various shapes, and printing on it in black or monochrome with dots, lines or patterns of various shapes, and haphazard colorations whereby the color effects which can be produced are infinite. If the sets of lines or dots on the impression surface are arranged so as to form letters in outline, color letters will be produced on the gray or otherwise tinted ground, or if the letters are surrounded by a solid border, color letters will be produced on a black or monochrome ground. Similarly patterns and designs in any shape or size may be produced. In place of paper or other printing surface, textile fabrics may be used suitably woven with threads of different colors, which would then be printed on in black or monochrome to obtain similar effects.

In carrying out my invention, the closeness of the lines, dots or patterns will depend upon the purpose for which the paper or other material is to be used. If it is intended to be viewed from a distance of a few feet or less, for example if it is to be used for the cover or the advertisement pages of a magazine, the number of sets of color lines or dots per inch may range from say 40 to 200. If the paper is for posters, or to be viewed at a considerable distance, as few as 3 or 4 sets of dots or lines per inch may suffice.

The color lines or dots on the paper may be made to lie next to one another without any interspace, or there may be interspaces, or they may overlap so as to give an even greater range of colors. The different color lines may either be all of equal widths, or of unequal widths, the individual lines may also be of equal widths throughout, or of variable width. I may also use colored paper or other material as my base, thus saving the necessity of printing one of the colors, as interspaces can be left blank. The ground tint moreover need not necessarily be the same all over. For instance by varying the width of the lines or the size of the dots in one or more of the colors, or by using different colors on different strips or areas of the paper, the ground tint may be made to vary in different parts.

It will be apparent from the description given that the particular color effects produced depend not only on the constituent colors of the ground surface and on the numerical relation of the pitch of the sets of color lines or dots to that of the obliterating lines or dots, but also upon the width shape or size of the obliterating lines or dots and upon the position in which they are printed on the others. Since for the purposes of my invention a general color scheme is desired and not a predetermined color at any given point, the desired effects are dependent only upon the angle (which may vary from 0° to any desired degree of obliquity) at which the obliterating lines are printed relatively to the color lines which form the ground tint. They are not dependent upon any horizontal or vertical shift of the impression surface relatively to the surface printed upon, so that there is no question of the exact registration, which is needful in printing color pictures or designs by methods employed hitherto in which a horizontal or vertical shift of the impression surface greatly affects the desired results. In other words lateral and vertical shifts do not affect the results aimed at while angular, that is to say, rotational, registration does.

According to my method the general color scheme and color effects to be produced can be readily predetermined, but as no attempt is made to produce particular colors at particular spots of the paper, e. g. where bands of changing color are produced, the position of any particular color will be indefinite.

The principle of the fusion of lines or dots in suitable colors printed or ruled very close together so as to produce a gray or white tint, and the subsequent obliteration of a definite part of them by black, has already been utilized, or attempted to be utilized for the production of printed color pictures by the aid of photography, but its use has been strictly limited to the making of actual pictures in predetermined colors in which of course it was essential that a particular color appeared at a particular spot, and for which it was necessary to first take negatives in the camera through suitable color screens, and from these make halftone blocks, which had to be printed on to the prepared surface in exact register. Since for the purposes of this invention as has already been explained a general color scheme independent of the incidence of any given color or colors is desired, it becomes possible to produce color effects on paper or other material cheaply, where such could not be produced before, because the paper or other material with the color lines or dots thereon forming the ground tint can be produced in quantities as a regular article, and to produce color patterns on it, is then only a matter of the ordinary commercial printing in black or in any single color. It thus becomes available for all sorts of advertisement purposes, in magazines and journals, for book-covers, box-covers and linings, for showcards, for wall papers, for woven materials, and fabrics, and many other purposes of commerce and art.

What I claim is:

1. A process of producing color effects by printing in monochrome only, using an impression surface provided with lines or dots and printing on to material provided with color lines or dots arranged in sets in a regular sequence, the desired results being solely obtained by suitable rotational adjustment of the lines or dots on the impression surface in reference to the lines or dots on the material printed on.

2. A process of producing color effects by printing in monochrome only, using an impression surface provided with lines or dots and printing on to textile fabric having threads of different colors, in sets of regular sequence, the desired results being solely obtained by suitable rotational adjustment of the impression surface in reference to the fabric printed on.

3. A surface exhibiting multi-color designs of definite character but of haphazard coloration in any given part consisting of sets of lines or dots in monochrome printed at an angle to and upon sets of color lines or dots substantially parallel to one another and arranged in sets in a regular sequence with which the aforesaid surface has been initially provided.

4. A textile fabric surface exhibiting multi-color designs of definite character but of haphazard coloration in any given part consisting of sets of lines or dots in monochrome printed at an angle to and upon sets of color lines or dots substantially parallel to one another and arranged in sets in a regular sequence formed by the colored threads used in weaving the fabric.

In testimony whereof I have hereunto set my hand in presence of two subscribing witnesses.

JULIUS RHEINBERG.

Witnesses:
R. D. LYNDE,
A. V. HOOKER.